United States Patent [19]

Walton

[11] 4,278,648
[45] Jul. 14, 1981

[54] METHOD OF IMPROVING SILICEOUS FILTER AID DISPERSION IN WET PROCESS ORTHOPHOSPHORIC ACID PRODUCTION SYSTEMS

[75] Inventor: Harris G. Walton, Littleton, Colo.

[73] Assignee: Johns-Manville Corporation, Denver, Colo.

[21] Appl. No.: 130,874

[22] Filed: Mar. 17, 1980

[51] Int. Cl.$^3$ ............................................. C01B 25/16
[52] U.S. Cl. .................................. 423/319; 423/320; 423/321 R
[58] Field of Search ................... 423/319, 320, 321 R

[56] References Cited

FOREIGN PATENT DOCUMENTS 463505   3/1950   Canada .............................. 423/321 R

*Primary Examiner*—Helen M. McCarthy
*Assistant Examiner*—Gregory A. Heller
*Attorney, Agent, or Firm*—Robert M. Krone; Joseph J. Kelly

[57] ABSTRACT

A process is disclosed for improving the dispersability of siliceous (preferably diatomite) filter aid particles in hot (i.e., 140° F. or higher) aqueous acid systems used in the "wet process" formation of orthophosphoric acid from phosphate rock. In this process the filter aid particles are prewetted with water to cause the adsorption of 15 to 75 weight percent of water on the filter aid prior to dispersing the prewetted filter aid in the acid system.

10 Claims, No Drawings

METHOD OF IMPROVING SILICEOUS FILTER AID DISPERSION IN WET PROCESS ORTHOPHOSPHORIC ACID PRODUCTION SYSTEMS

TECHNICAL FIELD

The invention herein relates to the dispersion of solid filter aid materials in hot aqueous acid systems. More particularly, it relates to the dispersion of siliceous filter aids in "wet process" orthophosphoric acid production systems.

BACKGROUND OF PRIOR ART

In the commercial "wet process" production of orthophosphoric acid ($H_3PO_4$), phosphate rock ("phosphorite"), which has the nominal chemical formula of $Ca_{10}F_2(PO_4)_6$, is reacted in a aqueous system with strong sulfuric acid. The acid reaction results in the formation of calcium sulfate, orthophosphoric acid and hydrogen fluoride. The hydrogen fluoride is largely evolved in gaseous form, although some may remain ionized in the aqueous medium to form hydrofluoric acid. The calcium sulfate is then filtered off and the orthophosphoric acid is recovered by evaporation of the liquid and crystallization of the acid. In addition to removing the calcium sulfate product, the filtration step also serves to remove salts formed from oxide impurities which are in the phosphorite. These include the salts of magnesium, aluminum, iron, titanium and various other metals. The phosphorite is described in Ladoo et al, *Nonmetallic Minerals* (2d edn., 1951) on pages 379–393, and the orthophosphoric acid production reaction is described in Shreve et al, *Chemical Process Industries* (4th edn., 1977) on pages 252 and 253.

The filtration step is normally carried out using a rotary vacuum precoat filter. Dry diatomaceous earth ("diatomite") filter aid is used to form a precoat on the filter and is also used as a body feed in the filtration slurry system. The precoating and subsequent filtration using the aqueous acid system are carried out at temperatures on the order of 160° F. (71° C.) and higher. These temperature requirements, however, create difficulties in the filtration system both at the precoat stage and at the subsequent filtration stage using diatomite body feed, for diatomite does not disperse easily or completely in the orthophosphoric acid system at temperatures above 140° F. (60° C.). Thus, in order to obtain the desired benefits of a diatomite filtration system, the orthophosphoric acid producer must devote an inordinate amount of time to forming the diatomite precoat and thereafter to dispersing the diatomite body feed in the hot aqueous acid system.

It would therefore be highly desirable to have a method for improving the dispersion characteristic of diatomite and other siliceous filter aids in the "wet process" orthophosphoric acid production systems.

BRIEF SUMMARY OF THE INVENTION

The invention herein involves improving the dispersibility of siliceous filter aids, particularly diatomite, in a hot aqueous acid system in which orthophosphoric acid is produced from phosphate rock, which comprises wetting the filter aid with water in a quantity of 15 to 75 weight percent based on the weight of the dry filter aid prior to dispersing the filter aid in the hot aqueous acid system. More specifically, in a wet process wherein solid products of the reaction of sulfuric acid and phosphate rock dispersed in an aqueous acid medium are removed by filtration from said medium using a siliceous filter aid (preferably diatomite), and wherein said aqueous acid medium is at a temperature of at least 140° F., the invention herein is the improvement which comprises increasing the ability of the filter aid particles to disperse in said aqueous acid medium or to form a precoat by contacting said filter air particles with water to adsorb on said particles 15 to 75 weight percent water based on the weight of the dry filter aid prior to dispersing said filter aid particles in said aqueous acid medium.

DETAILED DESCRIPTION OF THE INVENTION

In the commercial "wet" orthophosphoric acid production process, the phosphate rock raw material is dispersed in concentrated aqueous sulfuric acid at a temperature of approximately 160° F. (70° C.). As described above, the phosphate rock reacts to form orthophosphoric acid as well as calcium sulfate, hydrogen fluoride and various metal sulfates and other salts (from the metal oxides present). The salts are removed by filtration. Rotary vacuum precoat filtration using diatomite filter aids as the precoat and also as the body feed during filtration has long been known to be a highly efficient filtration method used widely in a number of different types of filtration systems. In the present system, however, it has been observed that the dispersion of the granular diatomite filter aid particles is poor and that formation of the precoat takes an inordinate amount of time. In addition, the poor dispersion of the diatomite is detrimental to the use of the diatomite filter aid as a body feed. The exact reason for this poor dispersion is not known, but it is believed that gaseous reaction products form bubbles around the diatomite particles and cause the latter to float at the surface of the aqueous acid medium rather than being dispersed in the medium, and/or fluoride ion (which is present in the system in the form of hydrofluoric acid) reacts with the silica in the diatomite to form poorly dispersed fluosilicate compounds. The presence of the fluoride in the system is also believed to be a factor in the formation of the gaseous reaction products. It has proved to be impractical to separate the hydrofluoric acid and/or the gaseous reaction products from the system prior to filtration of the sulfate salts. It has also been determined to be impractical to reduce the system temperature to about 120° F. (50° C.) or lower, the temperatures at which diatomite does disperse adequately, because this results in a significant amount of energy wasted to reheat the system to the necessary phosphate rock reaction temperature following diatomite dispersion and also increases the viscosity of the acid system to an unacceptable degree. The present invention therefore is directed toward eliminating or minimizing the dispersion problem in the hot aqueous acid system by treating the diatomite to make it readily dispersible at the high temperature of the system. (As used herein, "hot" acid system refers to system temperatures of 140° F. (60° C.) or higher.)

Diatomaceous earth ("diatomite") is a well known material commonly used for filter aids. It is a siliceous material formed by the deposition in shallow seas some millions of years ago of the skeletal remains of microscopic single-celled aquatic water plants called diatoms. Deposits of diatomite are found in a number of places in the United States and other countries, with one of the largest and purest being a deposit on the central coast of California. Diatomite filter aids are produced commercially by mining, crushing, drying and cleaning the diatomite ore followed by separation of the diatomite particles into grades based on particle size distribution. Diatomite may also be calcined at temperatures on the order of about 1900° F. to 2200° F. (1040° C. to 1200° C.), either alone or in the presence of fluxes, to produce additional grades of diatomite filter aids. A wide variety of grades of natural, calcined and flux calcined diatomite filter aids are commercially available from the Johns-Manville Corporation under the trademark "CELITE."

In the process of this invention, granulated diatomite of any appropriate filter aid grade is prewetted with water prior to using it as a precoat or body feed in the hot aqueous orthophosphoric acid production system. Prewetting comprises contacting the filter aid with water until the material has adsorbed 15 to 75 weight percent, preferably 20 to 50 weight percent, water based on the weight of the dry diatomite. Because the water must subsequently be removed by evaporation, it is obviously beneficial to prewet the diatomite with as little water as possible while still accomplishing the desired results of the invention. Early experiments (such as those shown in Examples 2 and 3) used relatively large quantities of water. Subsequent work has established that water quantities significantly lower, such as about 20 to 30 weight percent, are entirely adequate, and even lower quantities (down to about 15 weight percent) give effective results. On a small scale, prewetting can be accomplished by putting the diatomite in a container with water. On a commercial scale, it would be more convenient to inject water into the air-conveying systems used to air convey the diatomite particles from the storage silos to the precoat and body feed mix tanks at the point of use. Any other procedure which will result in the adsorption of 15 to 75 weight percent water on the diatomite without detrimental effects to the diatomite or without undue cost or technical complexity is also quite suitable for use in the present invention. In order to minimize the cost of shipping, storing or transporting the wetted diatomite, it is most desirable to apply the water to the diatomite at a point in the process as close as possible to the point of actual use of the wetted diatomite.

While the reasons for the effectiveness of the invention are not fully understood, it is believed that it is due to diatomite's affinity for water and in turn the miscibility of the water in aqueous acid systems.

To illustrate the present invention, a series of tests were made to compare dispersibility of different amounts of diatomite in hot acid systems from commercial orthophosphoric acid production operations. In each case, 100 ml of 54 percent acid were mixed with 30 grams of commercial "CELITE" diatomite.

EXAMPLE 1

Dry "CELITE" grade 550 HD diatomite was mixed with the acid at 160° F. (71° C.) and thoroughly agitated for 30 seconds. Thereafter the system was allowed to settle to equilibrium. A substantial amount of the diatomite "wetted out" and sank to the bottom of the beaker. A significant fraction of the diatomite agglomerated into dry balls approximately 1 to 2 mm in size which floated on the surface of the acid.

EXAMPLE 2

The same grade of diatomite was prewetted with tap water to a dry end point of approximately 42 percent diatomite by weight and 58 percent water by weight. This prewetted material was then mixed with fresh acid at 160° F. (71° C.) with moderate agitation for 30 seconds. All of the diatomite dispersed rapidly in the acid and ultimately settled to the bottom following cessation of agitation, thus exhibiting both good dispersability and good precoat formation. Virtually no diatomite remained at the surface of the acid. Thus, as compared with the results of Example 1, the system of this invention provided virtually complete dispersion of the diatomite quickly and rapidly in the acid whereas the prior art system left a substantial amount of the diatomite floating as a granular froth on the top of the acid layer.

EXAMPLE 3

Example 2 was repeated using a water-wetted commercial "CELITE" grade 545 HD diatomite, which has a lower density than the "CELITE" grade 500 HD diatomite. Again, dispersion of the water-wetted diatomite was complete and rapid in the 160° F. (71° C.) acid. It was observed that the settled material at the bottom of the container after cessation of agitation had approximately 25 percent greater volume than did the settled high density diatomite. This would indicate that a suitable precoat of low density diatomite can be formed using approximately 25 percent less prewetted diatomite than would be necessary to form the same thickness of precoat with the high density diatomite.

EXAMPLE 4

For a comparison, the same grade of diatomite as in Example 3 was prewetted with an equivalent amount of acid rather than water. The results of attempting to disperse this acid-prewetted diatomite were quite unsuccessful in that the dispersion was poor, much more severe mixing and agitation were required to get minimal dispersion of the diatomite and the material that settled following agitation was a "mud" containing approximately one-third diatomite and two-thirds acid rather than being a settled diatomite layer equivalent to a precoat. In addition, a substantial amount of undispersed diatomite remained floating on the surface of the thin layer of free acid above the "mud" precipitate.

EXAMPLE 5

For comparison purposes, dry diatomite of the same grade as in Examples 3 and 4 was mixed with 120° F. acid. This material dispersed freely in the acid and formed an acceptable settled layer at the conclusion of agitation. The high temperature systems of Examples 2 and 3 provided equal or better dispersion of the diatomite, however, without the significant increase in acid viscosity and heat energy requirements which are found in the lower temperature system.

It is evident from these examples that the system of prewetting the diatomite prior to dispersion of the prewetted material in the hot orthophosphoric acid system provides for excellent dispersion of the filter aid in the hot acid without any detrimental effects on acid viscosity or energy requirements for the system.

It will be understood that while the invention herein is described in terms of diatomite filter aids, it will also be applicable to other predominantly siliceous filter aid materials, most notably perlite. Filter aid materials such a fly ash which may have a high silica content would also be suitable for use in this process.

STATEMENT OF INDUSTRIAL APPLICATION

The invention herein is useful in the industrial "wet process" for manufacture of orthophosphoric acid. The orthophosphoric acid in turn is used in the production of many high grade fertilizers and in the manufacture of phosphate chemicals.

I claim:

1. In a process wherein solid products of the reaction of sulfuric acid and phosphate rock dispersed in an aqueous acid medium are removed by filtration from said medium using a siliceous filter aid, and wherein said aqueous acid medium is at a temperature of at least 140° F., the improvement which comprises increasing the ability of the filter aid to disperse in said aqueous acid medium or to form a precoat by contacting said filter aid particles with water to adsorb on said particles 15 to 75 weight percent water based on the weight of the dry filter aid prior to dispersing said filter aid particles in said aqueous acid medium.

2. An improved process as in claim 1 wherein said water is present as 20 to 50 weight percent based on the weight of said dry filter aid.

3. An improved process as in claim 2 wherein said water is present as 20 to 30 weight percent based on the weight of said dry filter aid.

4. An improved process as in claims 1, 2 or 3 wherein said aqueous acid medium is aqueous sulfuric acid in which phosphate rock is dissolved and reacted to form orthophosphoric acid, calcium sulfate and hydrogen fluoride.

5. An improved process as in claim 4 wherein the reaction is conducted at a temperature of about 160° F.

6. An improved process as in claims 1, 2 or 3 wherein said filter aid comprises diatomite, perlite or fly ash.

7. An improved process as in claim 6 wherein said filter comprises diatomite.

8. An improved process as in claim 6 wherein said filter aid comprises perlite.

9. An improved process as in claim 7 wherein said aqueous acid medium is aqueous sulfuric acid in which phosphate rock is dissolved and reacted to form orthophosphoric acid, calcium sulfate and hydrogen fluoride.

10. An improved process as in claim 9 wherein the reaction is conducted at a temperature of about 160° F.

* * * * *